United States Patent
Prevost et al.

(10) Patent No.: US 8,740,141 B2
(45) Date of Patent: Jun. 3, 2014

(54) AIRCRAFT ARRESTOR SYSTEM AND METHOD OF DECELERATING AN AIRCRAFT

(75) Inventors: Jean Prevost, Westmount (CA); Donald VanDyke, Beaconsfield (CA)

(73) Assignee: Tarkett Inc., Farnham, Quebec (CA)

( * ) Notice: Subject to any disclaimer, the term of this patent is extended or adjusted under 35 U.S.C. 154(b) by 606 days.

(21) Appl. No.: 11/977,167

(22) Filed: Oct. 23, 2007

(65) Prior Publication Data

US 2009/0166469 A1  Jul. 2, 2009

Related U.S. Application Data

(60) Provisional application No. 60/862,537, filed on Oct. 23, 2006.

(51) Int. Cl.
*B64F 1/02* (2006.01)

(52) U.S. Cl.
USPC .................................................... 244/110 E

(58) Field of Classification Search
USPC ............... 244/110 E, 114 R, 110 R; 404/6
See application file for complete search history.

(56) References Cited

U.S. PATENT DOCUMENTS

| | | | |
|---|---|---|---|
| 3,066,896 A | 12/1962 | Schirtzinger | |
| 3,932,051 A | 1/1976 | Cleary | |
| 4,044,179 A | 8/1977 | Haas, Jr. | |
| 4,047,491 A | 9/1977 | Spanel et al. | |
| 4,216,735 A | 8/1980 | McDaniel, Jr. | |
| 4,362,780 A | 12/1982 | Marzocchi et al. | |
| 4,396,653 A | 8/1983 | Tomarin | |
| 4,442,148 A | 4/1984 | Stierli | |
| 4,755,401 A | 7/1988 | Friedrich et al. | |
| 4,884,865 A | 12/1989 | Grise | |
| 4,896,453 A | 1/1990 | Jacob | |
| 4,904,050 A | 2/1990 | Dunn et al. | |
| 5,013,029 A | 5/1991 | Vaux | |
| 5,090,154 A | 2/1992 | Jacob | |
| 5,131,787 A | 7/1992 | Goldberg | |
| 5,134,386 A | 7/1992 | Swanic | |
| 5,206,058 A | 4/1993 | Fry et al. | |
| 5,392,723 A | 2/1995 | Kaju | |
| 5,439,968 A | 8/1995 | Hyche | |

(Continued)

FOREIGN PATENT DOCUMENTS

| | | |
|---|---|---|
| CA | 2238953 A1 | 11/1999 |
| GB | 1 282 103 A | 7/1972 |
| WO | 98/35099 A1 | 8/1998 |
| WO | WO 02/20903 A1 | 3/2002 |

OTHER PUBLICATIONS

Soil Stabilization Products Company Inc. "Airfield Shoulder Stabilization" Soil Stabilization Products Co. Inc. 2002—1 page.

(Continued)

*Primary Examiner* — Philip J Bonzell
(74) *Attorney, Agent, or Firm* — Winston & Strawn LLP

(57) ABSTRACT

An arrestor system and method of decelerating an aircraft. The arrestor system has a base with at least one tile made of a plurality of particles being arranged such that the particles form a plurality of water drainage passageways and wherein the at least one tile has a compressive strength which will fatigue upon a force being imparted thereto which is greater than the compressive strength of the tile.

7 Claims, 3 Drawing Sheets

(56) References Cited

U.S. PATENT DOCUMENTS

| | | |
|---|---|---|
| 5,509,231 A | 4/1996 | Marcoux |
| 5,564,864 A | 10/1996 | Simpson et al. |
| 5,607,742 A | 3/1997 | Ing et al. |
| 5,863,147 A | 1/1999 | Pressler |
| 5,932,357 A | 8/1999 | Coates et al. |
| 6,039,767 A | 3/2000 | Boyes et al. |
| 6,247,267 B1 | 6/2001 | Motz et al. |
| 6,361,245 B1 | 3/2002 | Polivka |
| 6,620,482 B2 | 9/2003 | Carr et al. |
| 6,672,749 B2 | 1/2004 | Nicholls et al. |
| 6,699,137 B2 | 3/2004 | Szymanski |
| 6,794,007 B2 | 9/2004 | Carr et al. |
| 6,946,181 B2 | 9/2005 | Prevost |
| 6,950,599 B2 | 9/2005 | Nicholls et al. |
| 7,014,390 B1 | 3/2006 | Morris |
| 7,207,742 B2 | 4/2007 | Prevost |
| 7,223,047 B2 | 5/2007 | Prevost |
| 7,244,477 B2 | 7/2007 | Sawyer et al. |
| 7,300,689 B2 | 11/2007 | Prevost |
| 2003/0215287 A1 | 11/2003 | Prevost |
| 2004/0058095 A1 | 3/2004 | Carr |
| 2006/0018711 A1* | 1/2006 | Rogers et al. ............ 404/6 |
| 2006/0177270 A1 | 8/2006 | Rastegar et al. |

OTHER PUBLICATIONS

International Search Report and Written Opinion of PCT/US07/22442, 8 pages.

"Innovative Financing Backs Highway Project," Civil Engineering News, Oct. 1998.

EP search report dated Aug. 9, 2012 for EP App. No. 07872635.

* cited by examiner

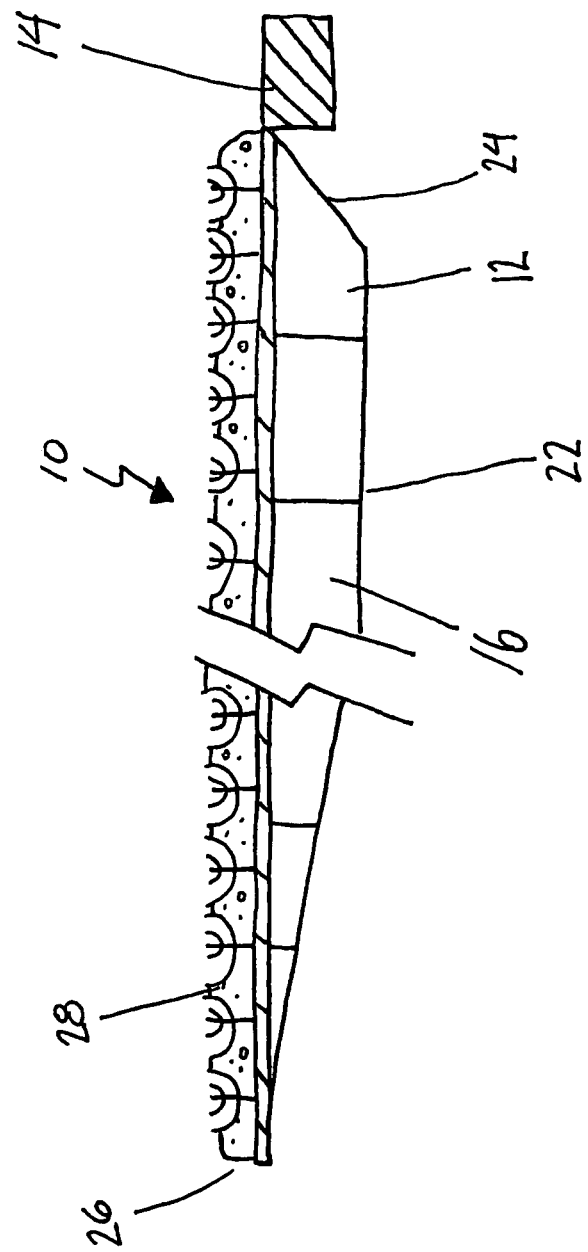

AIRCRAFT ARRESTOR SYSTEM AND METHOD OF DECELERATING AN AIRCRAFT

The present invention relates generally to aircraft arrestor systems and methods of decelerating an aircraft, and more particularly to a base to be used in an arrestor system.

BACKGROUND OF THE INVENTION

Aircraft can and do overrun the ends of the runways and taxiways at airports which may increase the chance of damage to passengers, the aircraft, the airport and/or pedestrians or other persons. While there is typically provided a safety area at the ends of the runways, some airports lack the space required to provide sufficient safety areas.

One device that has been utilized to provide assistance in decelerating an aircraft is an arrestor system. U.S. Pat. No. 3,066,896 issued to Schirtzinger discloses such a device. Additionally, the following patents disclose similar arrestor systems and/or a cellular concrete to be used in an arrestor system: U.S. Pat. Nos. 5,885,025; 5,902,068; 6,726,400; 6,685,387; 6,971,817. While presumably effective for their intended purposes, the patents related to cellular concrete disclose that obtaining an appropriate cellular concrete with sufficient strength can be difficult. Additionally, the device disclosed in U.S. Pat. No. 3,066,896 discloses a cover for the arrestor bed that may be considered aesthetically unpleasing.

SUMMARY OF THE INVENTION

It is an object of the present invention to provide an arrestor system that will have improved drainage characteristics.

It is an object of the present invention to provide an arrestor system that is relatively easy to replace after an aircraft has utilized the arrestor system to decelerate. These and other objects of the present invention will be apparent and readily understood to those of ordinary skill in the art which have the present description and attached drawings before them.

Therefore, in accordance with the present invention, an aircraft arrestor system is provided which includes a base located adjacent a runway having at least one tile comprised of a plurality of particles being arranged such that the particles form a plurality of water drainage passageways and wherein the at least one tile has a compressive strength which will fatigue upon a force greater than the compressive strength.

In accordance with a general aspect of the present invention, there is provided a method of decelerating an aircraft including the steps of providing a base located adjacent a runway having at least one tile comprised of a plurality of particles being arranged such that the particles form a plurality of water drainage passageways and wherein the at least one tile has a compressive strength which will fatigue upon a force greater than the compressive strength, providing the force greater than the compressive strength, wherein the force is provided by the aircraft, and decelerating the airplane.

DETAILED DESCRIPTION OF THE DRAWINGS

FIG. 1a is a partial cross-sectional side view of an arrestor system according to the present invention.

DETAILED DESCRIPTION OF THE PREFERRED EMBODIMENTS

Figure 2A:
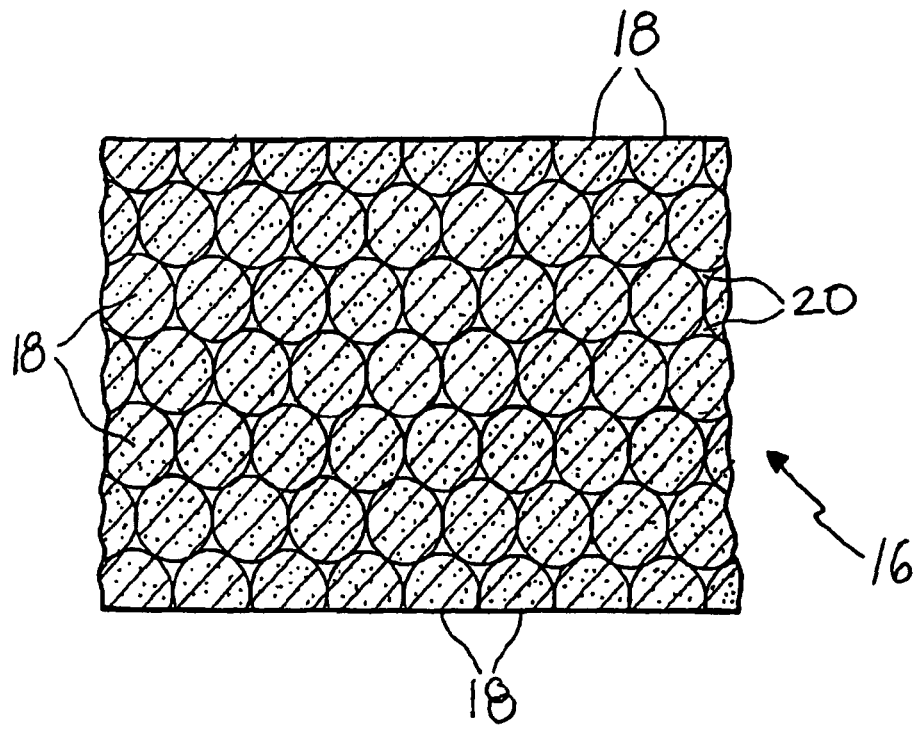
FIG. 2a is a side view cross section of a first tile of a base of the arrestor system.
Figure 2B:
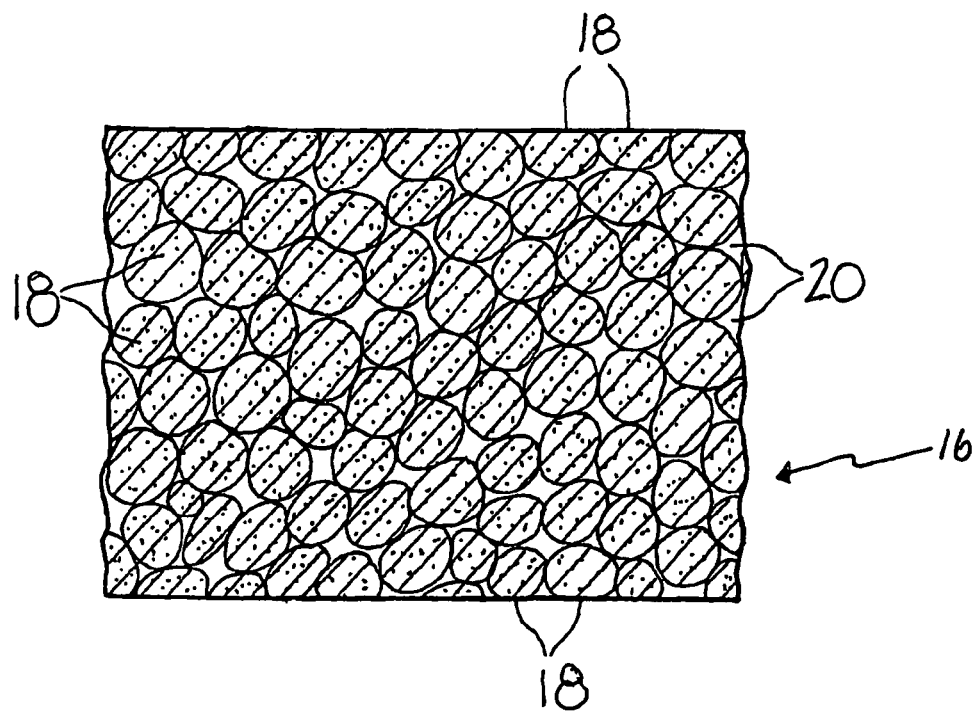
FIG. 2b is a side view cross section of a second tile of a base of the arrestor system.
Figure 3:
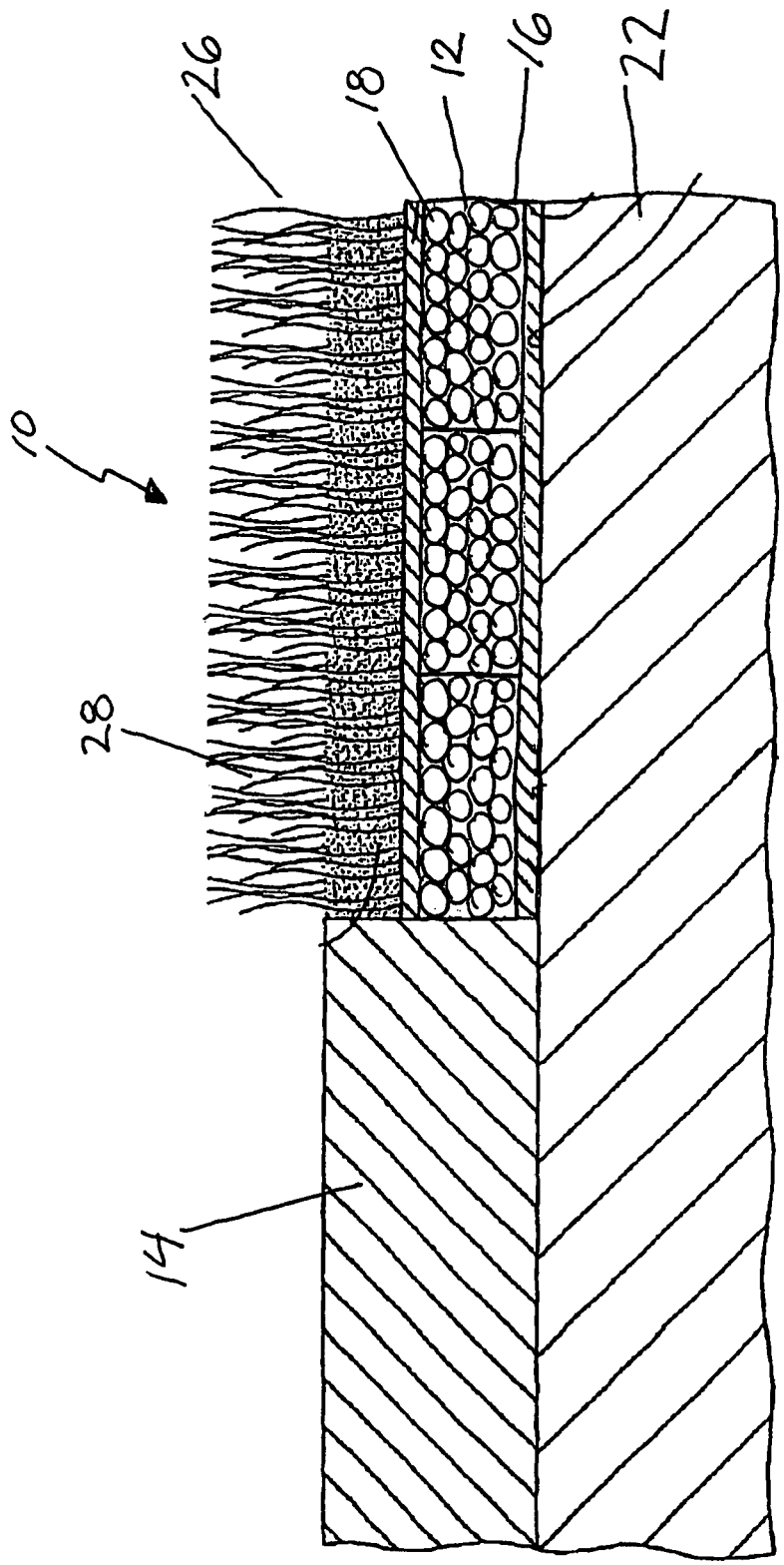
FIG. 3 is a side view of an artificial grass system used in with an arrestor system according to the present invention.

Having thus generally described the nature of the invention, reference will now be made to the accompanying drawings, showing by way of illustration a preferred embodiment thereof. FIG. 1 illustrates an aircraft arrestor system 10 comprising a base 12 located adjacent a runway 14. The base 12 has at least one tile 16 comprised of a plurality of particles 18 being arranged such that the particles 18 form a plurality of water drainage passageways 20. These types of tiles 16 have been used as a base in sports fields with synthetic grass systems and are disclosed in U.S. Pat. No. 7,244,477. The particles 18 may be substantially spherically shaped (FIG. 2a) and/or they may be substantially equally sized. Alternatively, the particles 18 may be differently shaped (FIG. 2b). Moreover, the tile 16 may further include a binding agent, which is known to those of ordinary skill in the art.

The tile 16 has a compressive strength which will fatigue upon a force greater than its compressive strength. The compressive strength is the weight which the tile 16 will support without fatigue/fracturing. Once the weight exceeds the compressive strength of the tile 16, the tile 16 will fracture and typically break apart. In an application where an airport has generally large aircraft, the tile 16 will ideally have a higher compressive strength than in an application at an airport that generally has smaller aircraft. For example, a Boeing 747 aircraft is believed to have a maximum take off weight of 255,000 lbs. Thus, the tile preferably will have a compressive strength of less than 255,000 lbs. Additionally, a Cessna 150 aircraft is believed to have a gross weight limit of 1600 lbs. Thus, the tile will preferably have a compressive strength less than 1600 lbs. Thus, determining the required compressive strength will depend in part on the airport and the size of airplanes typically frequenting the airport.

It is also contemplated that the compressive strength of the tile 16 is greater than the weight of a light vehicle. This would allow certain vehicles typically operating at airports to drive over the arrestor system 10 without exceeding the compressive strength. For example, an ambulance is believed to have a maximum road weight of approximately 14,000 lbs. Thus, the compressive strength should be greater than the ambulance weight, but less than the weight of the aircraft.

It is contemplated that the arrestor system 10 further includes a bed 22 disposed below the base 12. It is further contemplated that the bed 22 is graded. It is preferred that the bed 22 be 1,000 feet long and have a width of approximately 50 feet; however, it should be recognized that the size of the arrestor system 10 and bed 22 will vary from airport to airport based upon existing space. A graded bed 22 can be utilized to increase the ability to decelerate the aircraft. The end 24 of the bed 22 closest to the runway 14 may be graded down, although it should not be too steep to cause the aircraft to bounce. The bed 22 may then slowly slope upwards to aide in decelerating the aircraft.

The arrestor system 10 may also include a cover 26 disposed above the at least one tile 10. Additionally, the arrestor system 10 may also include an artificial grass system 28 disposed above the base 12. Artificial grass systems 28 are known in the relevant art and have been used in airport applications. The artificial grass system 28 may decrease the amount of wildlife, which has been recognized to be a problem at airports.

The present invention also contemplates a method of decelerating an aircraft, including the steps of: providing a base located adjacent a runway having at least one tile comprised of a plurality of particles being arranged such that the particles form a plurality of water drainage passageways and wherein the at least one tile has a compressive strength which will fatigue upon a force being imparted thereto which is greater than the compressive strength of the tile; providing the force greater than the compressive strength, wherein the force is provided by the aircraft; and, decelerating the airplane. As the aircraft rolls onto the arrestor system, the force from the weight of the aircraft will be such that the tiles are fractured. The aircraft will then be decelerated.

The method may also include replacing the tile after the step of decelerating the airplane and covering the base with an artificial grass system.

We claim:

1. An aircraft arrestor system comprising:
   a base located adjacent a runway having plurality of replaceable tiles,
   a bed disposed below the base, and
   an artificial grass system disposed above the plurality of replaceable tiles as a cover, whereby forming a triple layer of artificial grass system, replaceable tiles, and bed adjacent to the runway wherein
   each of the plurality of the replaceable tiles comprises a plurality of particles and a binding agent holding the particles together such that the plurality of particles form a plurality of water drainage passageways in each replaceable tile, is in direct contact with the bed, and has a compressive strength that is less than the weight of an aircraft but greater than the weight of a light vehicle, and
   whereby when an aircraft rolls over the arrestor system, the plurality of replaceable tiles, disposed under the artificial grass system, fracture from the force of the aircraft and decelerate the aircraft.

2. The arrestor system of claim 1 further comprising the particles being substantially spherically shaped.

3. The arrestor system of claim 1 further comprising the particles being substantially equally sized.

4. The arrestor system of claim 1 wherein the bed is graded down from an end of the bed closest to the runway and then slowly slope upwards to another end of the bed furthest to the runway.

5. A method of decelerating an aircraft, comprising the steps of:
   providing a base located adjacent a runway having a plurality of replaceable tiles,
   providing a bed disposed below the base,
   disposing an artificial grass system above the plurality of replaceable tiles as a cover, whereby forming a triple layer of artificial grass system, replaceable tiles, and bed adjacent to the runway wherein
      each of the plurality of the replaceable tiles comprises a plurality of particles and a binding agent holding the particles together such that the plurality of particles form a plurality of water drainage passageways in each replaceable tile, is in direct contact with the bed, and has a compressive strength that is less than the weight of an aircraft but greater than the weight of a light vehicle,
   rolling the aircraft over the arrestor system, and
   fracturing the plurality of replaceable tiles, disposed under the artificial grass system, from the force of the aircraft to decelerate the aircraft.

6. The method of claim 5 further comprising the step of:
   replacing the fractured tiles after the step of fracturing the plurality of replaceable tiles from the weight of the aircraft.

7. The method of claim 5 wherein the bed provided is graded down from an end of the bed closest to the runway and then slowly slope upwards to another end of the bed furthest to the runway.

* * * * *